US012160702B2

(12) United States Patent
Sun

(10) Patent No.: US 12,160,702 B2
(45) Date of Patent: Dec. 3, 2024

(54) SOUND PICKUP DEVICE DAMPING STRUCTURE AND SOUND PICKUP APPARATUS

(71) Applicant: Beijing Bytedance Network Technology Co., Ltd., Beijing (CN)

(72) Inventor: Haitao Sun, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 138 days.

(21) Appl. No.: 17/928,904

(22) PCT Filed: May 13, 2021

(86) PCT No.: PCT/CN2021/093606
§ 371 (c)(1),
(2) Date: Nov. 30, 2022

(87) PCT Pub. No.: WO2022/022004
PCT Pub. Date: Feb. 3, 2022

(65) Prior Publication Data

US 2023/0232149 A1 Jul. 20, 2023

(30) Foreign Application Priority Data

Jul. 29, 2020 (CN) ......................... 202010746676.0

(51) Int. Cl.
*H04R 1/28* (2006.01)
*H04R 1/08* (2006.01)

(52) U.S. Cl.
CPC ................ *H04R 1/28* (2013.01); *H04R 1/08* (2013.01)

(58) Field of Classification Search
None
See application file for complete search history.

(56) References Cited

U.S. PATENT DOCUMENTS

2018/0310093 A1* 10/2018 Muramoto ........... H04R 1/2876

FOREIGN PATENT DOCUMENTS

| | | | |
|---|---|---|---|
| CN | 108513193 | A | 9/2018 |
| CN | 109379650 | A | 2/2019 |
| CN | 209861104 | U | 12/2019 |
| CN | 212259316 | U | 12/2020 |
| EP | 3236671 | A1 | 10/2017 |

OTHER PUBLICATIONS

International Search Report and Written Opinion in PCT/CN2021/093606, mailed Jul. 30, 2021, 10 pages.

* cited by examiner

*Primary Examiner* — Kenny H Truong
(74) *Attorney, Agent, or Firm* — Astute IP Law Group

(57) ABSTRACT

A sound pickup device damping structure and a sound pickup apparatus, the sound pickup device damping structure includes: a housing, including a side wall and a peripheral wall connected with the side wall; a circuit board, fixedly connected with the peripheral wall, wherein the circuit board and the side wall and the peripheral wall enclose to form an accommodating chamber; at least one sound pickup component, located in the accommodating chamber and electrically connected with the circuit board; and a first damping layer, disposed between the side wall and the sound pickup component; wherein a second sound pickup hole in the side wall, a hole channel in the first damping layer and a first sound pickup hole disposed in the sound pickup component are communicated with each other.

11 Claims, 2 Drawing Sheets

SOUND PICKUP DEVICE DAMPING STRUCTURE AND SOUND PICKUP APPARATUS

This application is a national stage application, filed under 35 U.S.C. § 371, of International Patent Application No. PCT/CN2021/093606, filed on May 13, 2021, which claims the priority benefit of Chinese patent application No. 202010746676.0, filed on Jul. 29, 2020, the entire disclosure of which are incorporated herein by reference as part of the present application.

TECHNICAL FIELD

The present application relates to a technical field of sound pickup device, in particular to a sound pickup device damping structure and a sound pickup apparatus.

BACKGROUND

With the development of intelligent terminal technology, more and more apparatuses with voice interaction function appear in the market, and the voice interaction function needs to receive voice information from the user through a microphone. Most of the existing apparatuses with voice interaction function in the market directly connect the microphone to the structure of the apparatus through hardware connection.

SUMMARY

In a first aspect, the embodiments of the present application provide a sound pickup device damping structure, including: a housing, including a side wall and a peripheral wall connected with the side wall; a circuit board, fixedly connected with the peripheral wall, wherein the circuit board and the side wall and the peripheral wall enclose to form an accommodating chamber; at least one sound pickup component, located in the accommodating chamber and electrically connected with the circuit board; and a first damping layer, disposed between the side wall and the sound pickup component; wherein a second sound pickup hole in the side wall, a hole channel in the first damping layer and a first sound pickup hole disposed in the sound pickup component are communicated with each other.

Optionally, the sound pickup device damping structure further includes: at least one sealing piece, disposed between the first damping layer and the sound pickup component and configured for covering the sound pickup component; wherein a hole channel of the sealing piece is communicated with the hole channel in the first damping layer and the first sound pickup hole disposed in the sound pickup component.

Optionally, center lines of the first sound pickup hole, the hole channel in the first damping layer, the hole channel of the sealing piece and the second sound pickup hole are located on a same straight line.

Optionally, in a case that the side wall is provided with at least two second sound pickup holes, center points of respective ones of the at least two second sound pickup holes are located on a same horizontal line.

Optionally, two sides of each first sound pickup hole are respectively provided with at least one mounting hole, and a center point of the at least one mounting hole and a center point of the first sound pickup hole are located on a same straight line; wherein a fastener is disposed in the mounting hole, and the fastener is configured for fixedly connecting the circuit board and the housing.

Optionally, a side of the circuit board away from the sound pickup component is provided with a screw, which is configured for connecting the circuit board with the sound pickup component.

Optionally, the sealing piece includes a silicone sleeve, and the silicone sleeve is sleeved on the sound pickup component.

Optionally, the sound pickup device damping structure further includes a second damping layer disposed between the peripheral wall and the sealing piece.

Optionally, in a direction from an end of the second sound pickup hole close to the first damping layer to an end of the second sound pickup hole away from the first damping layer, the second sound pickup hole gradually extends to an interior of the side wall, so that a diameter of the end away from the first damping layer is larger than a diameter of the end close to the first damping layer; both a diameter of the hole channel in the first damping layer and a diameter of the hole channel of the sealing piece are smaller than or equal to the diameter of the end of the second sound pickup hole close to the first damping layer, and a diameter of the first sound pickup hole is smaller than or equal to the diameter of the hole channel in the first damping layer or the hole channel of the sealing piece.

Optionally, materials of the first damping layer and the second damping layer includes at least one selected from a group consisting of polyurethane, silica gel and rubber.

In a second aspect, the present application provides a sound pickup apparatus, including the sound pickup device damping structure according to the above first aspect.

BRIEF DESCRIPTION OF THE DRAWINGS

The above and/or additional aspects and advantages of the present application will become apparent and easy to understand from the following description of embodiments taken in conjunction with the accompanying drawings, in which.

DESCRIPTION OF REFERENCE NUMERALS IN THE ACCOMPANYING DRAWINGS

Figure 1:
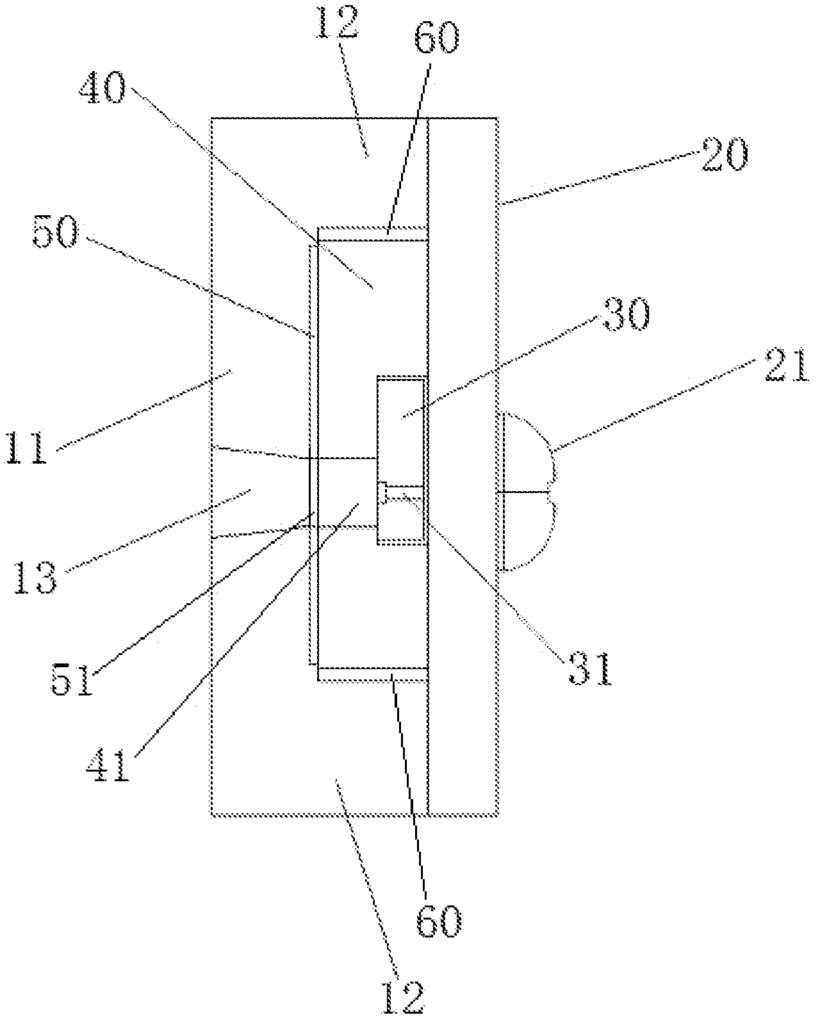
FIG. 1 is a structural schematic view of a sound pickup device damping structure provided by an embodiment of the present application.

1: side wall; 12: peripheral wall; 13: second sound pickup hole;
20: circuit board; 21: screw;
30: sound pickup component; 31: first sound pickup hole; 32: mounting hole;
40: sealing piece; 41: hole channel of the sealing piece 40;
50: first damping layer; 51: hole channel of the first damping layer 50;
60: second damping layer.

DETAILED DESCRIPTION

The present application is described in detail below, and examples of embodiments of the present application are illustrated in the accompanying drawings, in which the same or similar reference numerals refer to the same or similar components or components with the same or similar functions throughout the description. In addition, if a detailed description of a known technology is unnecessary for the illustrated features of the present application, then the detailed description of the known technology will be omitted. The embodiments described below with reference to the accompanying drawings are illustrative, and are only used to explain the present application, and should not be construed as a limitation of the present application.

It can be understood by those skilled in the art that, unless otherwise defined, all the terms (including technical terms and scientific terms) used herein have the same meanings as those commonly understood by those skilled in the art to which this application belongs. It should also be understood that, terms such as those defined in general dictionaries should be understood to have meanings consistent with those in the context of the prior art, and will not be interpreted with idealized or overly formal meanings unless specifically defined herein.

Those skilled in the art can understand that, unless specifically stated, the singular forms “a”, “an”, “said” and “the” used herein can also include plural forms. It should be further understood that, the word “comprise/include” used in the specification of the present application indicates the presence of said feature, integer, step, operation, element and/or component, but does not exclude the presence or addition of one or more other features, integers, steps, operations, elements, components and/or combinations thereof. It should be understood that, in the case where an element is described as being “connected” or “coupled” to another element, the element may be directly connected or coupled to another element, or an intermediate element may further be existed. In addition, “connection” or “coupling” used herein may include wireless connection or wireless coupling. The expression “and/or” used herein includes all of or any unit of and all combinations of one or more associated listed items.

since most apparatus with voice interaction function in the existing market directly connect a microphone to a structure of the apparatus through hardware connection, the microphone is greatly affected by the apparatus. Especially, while the apparatus is operating, a vibration of the apparatus will propagate to the microphone, which will affect a sound pickup accuracy and recognition accuracy of the microphone. A conventional damping structure of the existing microphone cannot avoid the issue of sound pickup resonance of the microphone, thereby affecting the user experience.

Aiming at the defects of the prior art, the present application provides a sound pickup device damping structure and a sound pickup apparatus, which are used to solve the technical problem of sound pickup resonance of microphone in apparatus with voice interaction function in the prior art.

The technical solution provided by embodiments of the present application has the following beneficial technical effects:

In the sound pickup device damping structure provided by the embodiment of the present application, a circuit board, a side wall and a peripheral wall of a housing enclose to form an accommodating chamber that accommodates a sound pickup component. Through disposing a damping layer between the sound pickup component and the side wall, and communicating a second sound pickup hole in the side wall, a hole channel in the first damping layer and a first sound pickup hole disposed in the sound pickup component with each other, the mechanical vibration transmitted from the housing to the sound pickup component is reduced, and the influence of the vibration of the apparatus on the sound pickup accuracy and recognition accuracy of the sound pickup component is avoided while the apparatus is operating.

Additional aspects and advantages of the present application will be set forth in part in the following description, and will be apparent from the following description, or may be learned by practice of the present application.

The technical solution of the present application and how the technical solution of the present application solves the above technical problem will be explained in detail with specific embodiments below.

An embodiment of the present application provides a sound pickup device damping structure, a structural schematic view of the sound pickup device damping structure is illustrated in FIG. 1, the sound pickup device damping structure includes a housing, a circuit board 20, at least one sound pickup component 30, and a first damping layer 50; the housing includes a side wall 11 and a peripheral wall 12 connected with the side wall 11; the circuit board 20 is fixedly connected with the housing, and the circuit board 20, the side wall 11 and the peripheral wall 12 enclose to form an accommodating chamber; the at least one sound pickup component 30 is located in the accommodating chamber and electrically connected with the circuit board 20; the first damping layer 50 is disposed between the side wall 11 and the sound pickup component 30; the sound pickup component 30 is provided with a first sound pickup hole 31; and a second sound pickup hole 13 in the side wall 11, a hole channel 51 in the first damping layer 50 and the first sound pickup hole 31 disposed in the sound pickup component 30 are communicated with each other.

In the sound pickup device damping structure provided by the embodiment of the present application, the circuit board, the side wall and the peripheral wall of the housing enclose to form the accommodating chamber that accommodates the sound pickup component. By disposing the damping layer between the sound pickup component and the side wall, and connecting the second sound pickup hole in the side wall, the hole channel in the first damping layer and the first sound pickup hole disposed in the sound pickup component to each other, the mechanical vibration propagated from the housing to the sound pickup component is reduced, and the influence of the vibration of the apparatus on the sound pickup accuracy and recognition accuracy of the sound pickup component is avoided while the apparatus is operating.

Specifically, in the sound pickup device damping structure provided by the embodiment of the present application, the circuit board 20 and the side wall 11 and the peripheral wall 12 of the housing enclose to form the accommodating chamber, and the sound pickup component 30 is disposed in the accommodating chamber and electrically connected with the circuit board 20, through which the circuit board 20, the side wall 11 and the peripheral wall 12 can well isolate the sound pickup component 30 from the adverse influence of the external environment, therefore, the accommodating chamber can effectively protect the sound pickup component 30 located therein. The first damping layer 50 is disposed between the sound pickup component 30 and the side wall 11, and the accommodating chamber between the sound pickup component 30 and the side wall 11 is filled with the first damping layer 50, through which the propagation of mechanical vibration between the side wall 11 of the housing and the sound pickup component 30 can be alleviated, and the influence of apparatus vibration on the sound pickup accuracy and recognition accuracy of the sound pickup component 30 can be reduced. Meanwhile, the first damping layer 50 is filled between the sound pickup component 30 and the side wall 11, which can effectively cushion the side wall 11 and the peripheral wall 12 in the case that the apparatus is impacted by an external force, thereby achieving the purpose of protecting the sound pickup component 30.

In an embodiment of the present application, the sound pickup device damping structure further includes at least one sealing piece 40, which is disposed between the first damping layer 50 and the sound pickup component 30 to cover the sound pickup component 30. A hole channel 41 of the sealing piece 40 is communicated with the hole channel 51 in the first damping layer 50 and the first sound pickup hole 31 disposed in the sound pickup component 30, so as to ensure that a sound emitted by the sound pickup component 30 can normally propagate and an external sound can be normally recognized by the sound pickup component 30, and prevent the sealing piece 40, the first damping layer 50 and the like from blocking the sound propagation between the sound pickup component 30 and the external environment.

It should be noted that, through disposing the sealing piece 40 for covering the sound pickup component 30 between the first damping layer 50 and the sound pickup component 30, the sound pickup component 30 is covered with the sealing piece 40, which not only facilitates the installation and disassembly of the sound pickup device damping structure, but also further relieves the propagation of mechanical vibration between the side wall 11 of the housing and the sound pickup component 30, and the influence of apparatus vibration on the sound pickup accuracy and recognition accuracy of the sound pickup component 30 can be further reduced. In the embodiment of the present application, a number of the sealing piece(s) 40 is matched with a number of the sound pickup component(s) 30.

In an embodiment of the present application, center lines of the first sound pickup hole 31, the hole channel 51 in the first damping layer, the hole channel 41 of the sealing piece 40 and the second sound pickup hole 13 are located on a same straight line.

In the sound pickup device damping structure provided by the embodiment of the present application, through setting the center lines of the first sound pickup hole 31, the hole channel 51 in the first damping layer, the hole channel 41 of the sealing piece 40 and the second sound pickup hole 13 on the same straight line, the loss of external sound occurred during a process of the external sound being propagated to the sound pickup component 30 can be effectively avoided, the efficiency of propagating external sound to the sound pickup component 30 can be improved, and the sound pickup accuracy and recognition accuracy of the sound pickup component 30 can be further improved, thereby improving the user experience.

In an embodiment of the present application, in the case that at least two second sound pickup holes 13 are disposed on the housing, center points of the respective ones of the at least two second sound pickup holes 13 are located on a same horizontal line.

Figure 2:
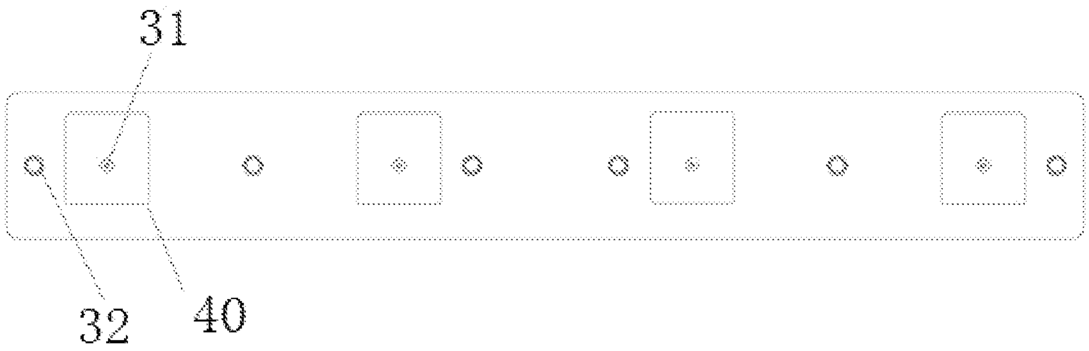
FIG. 2 is a structural schematic view of another sound pickup device damping structure provided by an embodiment of the present application.

It should be noted that, in the sound pickup device damping structure provided by the embodiment of the present application, a number of the second sound pickup hole(s) 13 disposed on the housing is matched with a number of the first sound pickup hole(s) 31 disposed on the sound pickup component 30, that is, each sound pickup component 30 corresponds to one second sound pickup hole 13. In order to ensure the sound pickup effect of a plurality of sound pickup components 30, in actual production and application, as illustrated in FIG. 2, which is a structural schematic view of the sound pickup device damping structure with the housing being removed, the center points of the first sound pickup holes 31 of a plurality of sound pickup components 30 are all arranged on a same horizontal line. Therefore, in order to correspond to the first sound pickup holes 31, the center points of the respective second sound pickup holes 13 on the housing of the sound pickup device damping structure are located on a same horizontal line.

In an embodiment of the present application, as illustrated in FIG. 2, at least one mounting hole 32 is respectively disposed on two sides of each first sound pickup hole 31, and a center point of the mounting hole 32 and a center point of the first sound pickup hole 31 are located on a same straight line; a fastener is disposed in the mounting hole 32, and configured for fixedly connecting the circuit board 20 and the housing.

It should be noted that, in the sound pickup device damping structure provided by the embodiment of this application, at least one mounting hole 32 is respectively arranged on two sides of the first sound pickup hole 31, and a fastener is disposed in the mounting hole 32, and the fixed connection between the circuit board 20 and the housing is achieved by the fastener, through which the stability of the connection between the housing and the circuit board 20 in the sound pickup device damping structure is further guaranteed, thereby further avoiding the vibration phenomenon caused by loose connection between the housing and the circuit board 20 while the apparatus vibrates. Furthermore, the mounting hole 32 is arranged close to the sound pickup component 30, so that the housing and the circuit board 20 near the sound pickup component 30 can be further pressed and fastened, and the sound pickup component 30 is prevented from being affected by the vibration of the apparatus as much as possible. Furthermore, the center point of the mounting hole 32 and the center point of the first sound pickup hole 31 are located on the same straight line, so that the force uniformity of the respective sound pickup components 30 in the linear direction can be ensured.

It is understood by those skilled in the art that, in the sound pickup device damping structure provided by the embodiment of the present application, the fastener may be a part and component for fixed connection, such as a screw, a staple bolt, or the like. It should be further noted that, an adhesive may further be disposed in the mounting hole 32, and the fixed connection through the adhesive can improve the tightness at the junction, thereby avoiding external dust from entering the interior of the sound pickup device damping structure.

In an embodiment of the present application, a side of the circuit board 20 away from the sound pickup component 30 is provided with a screw 21 for connecting the circuit board 20 with the sound pickup component 30.

As the sound pickup component 30 has a large volume and a certain weight, in order to prevent the sound pickup component 30 from being separated from the circuit board 20 in a process of the apparatus being shaked or impacted, in the sound pickup device damping structure provided by the embodiment of this application, the circuit board 20 and the sound pickup component 30 are fixedly connected by the screw 21, compared with bonding, welding and other methods, which not only improves the stability of the connection between the circuit board 20 and the sound pickup component 30, but also facilitates the disassembly and assembly of the circuit board 20 and the sound pickup component 30 in the maintenance process.

In an embodiment of the present application, the sealing piece 40 includes a silicone sleeve, and the silicone sleeve is sleeved on the sound pickup component 30.

In the sound pickup device damping structure provided in the embodiment of the present application, the sealing piece 40 includes the silicone sleeve, and the silicone sleeve is provided with a groove matched with a shape of the sound pickup component 30, so that the silicone sleeve is sleeved on the sound pickup component 30. Since the silicone sleeve has a certain elasticity, it can absorb and slow down the mechanical vibration propagated from the first damping layer 50 while sealing the sound pickup component 30, thereby isolating the mechanical vibration of the side wall 11 from being propagated to the sound pickup component 30, and further improving the sound pickup accuracy and recognition accuracy of the sound pickup component 30.

In an embodiment of the present application, a sound pickup device damping structure further includes a second damping layer 60, which is disposed between the peripheral wall 12 and the sealing piece 40.

In the sound pickup device damping structure provided in the embodiment of the present application, the second damping layer 60 is further provided between the peripheral wall 12 and the sealing piece 40. In this way, the second damping layer 60 can absorb and slow down the mechanical vibration propagated from the peripheral wall 12, through which the sound pickup component 30 can be effectively protected from the mechanical vibration propagating in a longitudinal direction along the peripheral wall 12 of the housing, thereby improving the anti-resonance performance of the sound pickup device damping structure, and preventing the vibration of the apparatus from affecting the sound pickup accuracy and recognition accuracy of the sound pickup component while the sound pickup apparatus is operating, and thus improving the use experience of the sound pickup apparatus.

In an embodiment of the present application, in a direction from an end of the second sound pickup hole 13 close to the first damping layer 50 to an end of the second sound pickup hole 13 away from the first damping layer 50, the second sound pickup hole 13 gradually extends to an interior of the side wall 11, so that a diameter of the end away from the first damping layer 50 is larger than a diameter of the end close to the first damping layer 50; both a diameter of the hole channel 51 in the first damping layer and a diameter of the hole channel 41 of the sealing piece 40 are smaller than or equal to the diameter of the end of the second sound pickup hole 13 close to the first damping layer 50, and a diameter of the first sound pickup hole 13 is smaller than or equal to the diameter of the hole channel 51 in the first damping layer or the hole channel 41 of the sealing piece 40.

It should be noted that, as illustrated in FIG. 1, in a direction from an exterior to an interior of the sound pickup device damping structure, apertures of the second sound pickup hole 13, the hole channel 51 in the first damping layer, the hole channel 41 of the sealing piece 40 and the first sound pickup hole 31 are gradually reduced, and meanwhile, a cross-sectional shape of the second sound pickup hole 13 is an trumpet-shape. In such a configuration, the efficiency of external sound entering into the interior of the sound pickup device damping structure is improved, the efficiency of external sound transmitting to the sound pickup component 30 is improved, and the sound pickup accuracy and recognition accuracy of the sound pickup component 30 are improved, thereby improving the user experience.

In an embodiment of the present application, materials of the first damping layer 50 and the second damping layer 60 include at least one of polyurethane, silica gel and rubber.

It should be noted that, the first damping layer 50 and the second damping layer 60 may be made of materials with good elasticity and damping performance, such as polyurethane, silica gel, rubber and the like, or combinations of the above materials.

According to the concept of the present application, an embodiment of the present application provides a sound pickup apparatus, which includes a sound pickup device damping structure provided by the above embodiments.

In the sound pickup apparatus provided by the embodiment of the present application, because the circuit board and the side wall and the peripheral wall of the housing of the sound pickup device damping structure enclose to form the accommodating chamber that accommodates the sound pickup component, and the sound pickup component is covered with the sealing piece, and the damping layer is disposed between the sealing piece and the side wall, through which the mechanical vibration transmitted from the housing to the sound pickup component is reduced, and the vibration of the apparatus is prevented from affecting the sound pickup accuracy and recognition accuracy of the sound pickup component while the sound pickup apparatus is operating, and thereby improving the use experience of the sound pickup apparatus.

Applying the embodiment of the present application can at least achieve the following beneficial effects:

1. In the sound pickup device damping structure provided by the embodiment of the present application, the circuit board and the side wall and the peripheral wall of the housing enclose to form the accommodating chamber for accommodating the sound pickup component. By disposing the damping layer between the sound pickup component and the side wall, and connecting the second sound pickup hole in the side wall, the hole channel in the first damping layer and the first sound pickup hole disposed in the sound pickup component to each other, the mechanical vibration transmitted from the housing to the sound pickup component is reduced, and the influence of the vibration of the apparatus on the sound pickup accuracy and recognition accuracy of the sound pickup component is avoided while the apparatus is operating.

2. In the sound pickup device damping structure provided by the embodiment of this application, at least one mounting hole 32 is respectively arranged on two sides of the first sound pickup hole 31, and a fastener is disposed in the mounting hole 32, the circuit board 20 and the housing are fixedly connected through the fastener, through which the stability of the connection between the housing and the circuit board 20 in the sound pickup device damping structure is further guaranteed, thereby avoiding the vibration phenomenon caused by loose connection between the housing and the circuit board 20 while the apparatus vibrates.

3. In the sound pickup device damping structure provided by the embodiment of this application, the mounting hole 32 is arranged close to the sound pickup component 30, so that the housing and the circuit board 20 near the sound pickup component 30 can be further pressed and fastened, and the sound pickup component 30 is prevented from being affected by the vibration of the apparatus as much as possible. Furthermore, the center point of the mounting hole 32 and the center point of the first sound pickup hole 31 are located on the same straight line, in such a configuration, the force uniformity of the respective sound pickup components 30 in the linear direction can be ensured.

In the description of the present application, it should be understood that, the orientations or positional relationships indicated by the terms “center”, “on”, “below”, “front”, “back”, “left”, “right”, “vertical”, “horizontal”, “top”, “bottom”, “inside” and “outside” or the like are based on the orientations or positional relationships shown in the accompanying drawings, which is only for the convenience of describing the present application and simplifying the description, and does not indicate or imply that the referred device or element must have a specific orientation, be constructed and operated in a specific orientation, therefore, these terms cannot be understood as limiting the present application.

The terms "first" and "second" are only used for descriptive purposes, and cannot be understood as indicating or implying relative importance or implicitly indicating the number of technical features indicated. Therefore, the features defined as "first" and "second" may include one or more of these features explicitly or implicitly. In the description of the present application, unless otherwise stated, "a plurality of" means two or more.

In the description of the present application, it should be noted that, unless otherwise specified and limited, the terms "installation", "connection to each other" and "connection" should be understood in a broad sense, for example, they may be fixed connection, detachably connection or integrally connection; may be directly connection or indirectly connection through an intermediate medium, or may be internal communication of two elements. For those of ordinary skill in the art, the specific meanings of the above terms in the present application can be understood in specific situations.

In the description of this specification, the specific features, structures, materials or characteristics may be combined in any one or more embodiments or examples in a suitable way.

The above are only some embodiments of the present application, and it should be pointed out that, for those of ordinary skill in this technical field, without departing from the principles of the present application, some improvements and modifications can be made, and these improvements and modifications should also be regarded as within the protection scope of the present application.

What is claimed is:

1. A sound pickup device damping structure, comprising:

a housing, comprising a side wall and a peripheral wall connected with the side wall;

a circuit board, fixedly connected with the peripheral wall, wherein the circuit board and the side wall and the peripheral wall enclose to form an accommodating chamber;

at least one sound pickup component, located in the accommodating chamber and electrically connected with the circuit board; and a first damping layer, disposed between the side wall and the sound pickup component;

wherein a second sound pickup hole in the side wall, a hole channel in the first damping layer and a first sound pickup hole disposed in the sound pickup component are communicated with each other.

2. The sound pickup device damping structure according to claim 1, further comprising:

at least one sealing piece, disposed between the first damping layer and the sound pickup component and configured for covering the sound pickup component;

wherein a hole channel of the sealing piece is communicated with the hole channel in the first damping layer and the first sound pickup hole disposed in the sound pickup component.

3. The sound pickup device damping structure according to claim 2, wherein center lines of the first sound pickup hole, the hole channel in the first damping layer, the hole channel of the sealing piece and the second sound pickup hole are located on a same straight line.

4. The sound pickup device damping structure according to claim 2, wherein the sealing piece comprises a silicone sleeve, and the silicone sleeve is sleeved on the sound pickup component.

5. The sound pickup device damping structure according to claim 2, further comprising a second damping layer, wherein the second damping layer is disposed between the peripheral wall and the sealing piece.

6. The sound pickup device damping structure according to claim 5, wherein materials of the first damping layer and the second damping layer comprises at least one selected from a group consisting of polyurethane, silica gel and rubber.

7. The sound pickup device damping structure according to claim 2, wherein in a direction from an end of the second sound pickup hole close to the first damping layer to an end of the second sound pickup hole away from the first damping layer, the second sound pickup hole gradually extends to an interior of the side wall, so that a diameter of the end away from the first damping layer is larger than a diameter of the end close to the first damping layer;

both a diameter of the hole channel in the first damping layer and a diameter of the hole channel of the sealing piece are smaller than or equal to the diameter of the end of the second sound pickup hole close to the first damping layer, and a diameter of the first sound pickup hole is smaller than or equal to the diameter of the hole channel in the first damping layer or the hole channel of the sealing piece.

8. The sound pickup device damping structure according to claim 1, wherein in a case that the side wall is provided with at least two second sound pickup holes, center points of respective ones of the at least two second sound pickup holes are located on a same horizontal line.

9. The sound pickup device damping structure according to claim 1, wherein two sides of each first sound pickup hole are respectively provided with at least one mounting hole, and a center point of the at least one mounting hole and a center point of the first sound pickup hole are located on a same straight line;

wherein a fastener is disposed in the mounting hole, and the fastener is configured for fixedly connecting the circuit board and the housing.

10. The sound pickup device damping structure according to claim 1, wherein a side of the circuit board away from the sound pickup component is provided with a screw, which is configured for connecting the circuit board with the sound pickup component.

11. A sound pickup apparatus, comprising the sound pickup device damping structure according to claim 1.

* * * * *